(12) United States Patent
Lohberg et al.

(10) Patent No.: US 6,504,360 B1
(45) Date of Patent: Jan. 7, 2003

(54) METHOD AND DEVICE FOR CHECKING THE INSTALLATION AIR GAP OF AN ACTIVE SENSOR

(75) Inventors: Peter Lohberg, Friedrichsdorf (DE); Klaus Hildebrandt, Darmstadt (DE)

(73) Assignees: Continental Teves AG & Co., Frankfurt (DE); OGH HDT Industrieplanung GmbH, Darmstadt (DE)

( * ) Notice: Subject to any disclaimer, the term of this patent is extended or adjusted under 35 U.S.C. 154(b) by 0 days.

(21) Appl. No.: 09/673,330

(22) PCT Filed: Apr. 8, 1999

(86) PCT No.: PCT/EP99/02364

§ 371 (c)(1),
(2), (4) Date: Apr. 20, 2001

(87) PCT Pub. No.: WO99/53327

PCT Pub. Date: Oct. 21, 1999

(30) Foreign Application Priority Data

Apr. 14, 1998 (DE) .......................................... 198 16 180
Mar. 23, 1999 (DE) .......................................... 199 12 877

(51) Int. Cl.[7] ............................. G01P 21/02; G01B 7/14
(52) U.S. Cl. .................. 324/202; 324/207.25; 324/166
(58) Field of Search ................................ 324/202, 225, 324/207.12, 207.25, 160, 166

(56) References Cited

U.S. PATENT DOCUMENTS

| 5,714,879 A | 2/1998 | Schmitt |
| 6,215,297 B1 * | 4/2001 | Blechmann et al. ... 324/202.12 |

FOREIGN PATENT DOCUMENTS

| DE | 34 40 538 | 5/1986 |
| DE | 39 41 473 | 6/1991 |
| DE | 43 19 322 | 12/1994 |
| DE | 44 34 977 | 4/1996 |
| DE | 44 34 978 | 4/1996 |
| DE | 44 45 819 | 6/1996 |
| DE | 694 08 938 | 3/1998 |
| EP | 0 569 224 | 11/1993 |
| EP | 0 569 924 | 11/1993 |

OTHER PUBLICATIONS

Search Report of the German Patent Office for Application No. 199 12 877.4.

* cited by examiner

*Primary Examiner*—Walter E. Snow
(74) *Attorney, Agent, or Firm*—Rader, Fishman & Grauer PLLC

(57) ABSTRACT

The present invention relates to a method for checking or determining the installation air slot between an active sensor and an encoder, wherein the maximum size of the air slot (maximum air slot) which still ensures trouble-free operation of the sensor depends on the level of the supply voltage of the sensor at least within a range of said supply voltage, and which is more particularly characterized by the following method steps: reducing the supply voltage of the sensor to at least one value by which the maximum air slot is each time decreased by a desired test measure, and comparing the at least one test measure with a desired difference between the maximum air slot and the existing air slot by sensing a variation of the sensor output signal by the reduction of the supply voltage, as well as evaluating the comparison result by signaling and/or storing. A corresponding device is also described.

9 Claims, 5 Drawing Sheets

METHOD AND DEVICE FOR CHECKING THE INSTALLATION AIR GAP OF AN ACTIVE SENSOR

TECHNICAL FIELD

The present invention generally relates to systems for setting up sensor/encoder pairs and more particularly relates to a method and a device for checking or determining the installation air slot between an active sensor and an encoder.

BACKGROUND OF THE INVENTION

Sensors of this type are used as motion sensors, for example, for sensing the rotational behavior of a vehicle wheel (wheel speed sensors) in slip-controlled brakes or anti-lock systems. The rotational movement is executed by a pole wheel provided in the encoder and producing the rotating magnetic field. This magnetic field is sensed by the sensor having a pick-up for measuring data which is for example a magneto resistive bridge (AMR bridge) that responds to variations in the magnetic field.

In order to ensure trouble-free transmission of the movements from the encoder to the sensor, care must be taken that the air slot (i.e. space between the sensor and the poles of the pole wheel) will never exceed the maximum air slot. In addition, there must be a defined minimum difference between the actual air slot and the maximum air slot in order that the maximum air slot will not be exceeded, not even temporarily, due to tolerances of structural elements, variations in temperature and dynamic deformations, or a certain variation in the supply voltage. To compensate for the changes in the air slot which are caused by the above variations, the sensor includes a trigger stage which is connected downstream of the magneto resistive bridge and by which the sensor output signal is maintained constant.

However, the arrangement set forth above suffers from the shortcoming that it cannot be checked after the assembly of the sensor whether the installation air slot is sufficiently smaller than the maximum air slot, i.e., whether a safety minimum difference exists between the two slots. The fact that the sensor output signal is present only implies that the air slot does not exceed the maximum air slot in that instant. However, the air slot may actually be already so large that the maximum air slot is nevertheless exceeded, e.g. temporarily, due to an unfavorable combination of the above-mentioned tolerance conditions, so that the transmission between encoder and sensor may at least be disturbed.

Measuring the actual distance by means of the signals received from the sensor is not possible due to the trigger stage installed in the sensor because this trigger stage generates a constant sensor output signal as long as the air slot does not exceed the maximum air slot.

In view of the above, an object of the present invention is to seek for a possibility of checking or determining the actual installation air slot and, especially, the difference between it and the maximum air slot in a sensor of the type mentioned hereinabove.

This object is achieved by a method of the type referred to hereinabove which is characterized by the following method steps:

reducing the supply voltage of the sensor to at least one value by which the maximum air slot is each time decreased by a desired test measure, and comparing the at least one test measure with a desired difference between the maximum air slot and the existing air slot by determining a variation of the sensor output signal by the reduction of the supply voltage, as well as evaluating the comparison result by signaling and/or storing.

This object is further achieved by a device of the above-mentioned type which is characterized by a first means which permits reducing the supply voltage of the sensor to at least one value by which the maximum air slot is decreased each time by a desired test measure, and a second means for comparing the at least one test measure with a desired difference between the maximum air slot and the actual air slot by sensing a variation of the sensor output signal by the reduced supply voltage as well as for evaluating the comparison result by signaling and/or storing.

DETAILED DESCRIPTION OF THE PREFERRED EMBODIMENTS

Figure 1:
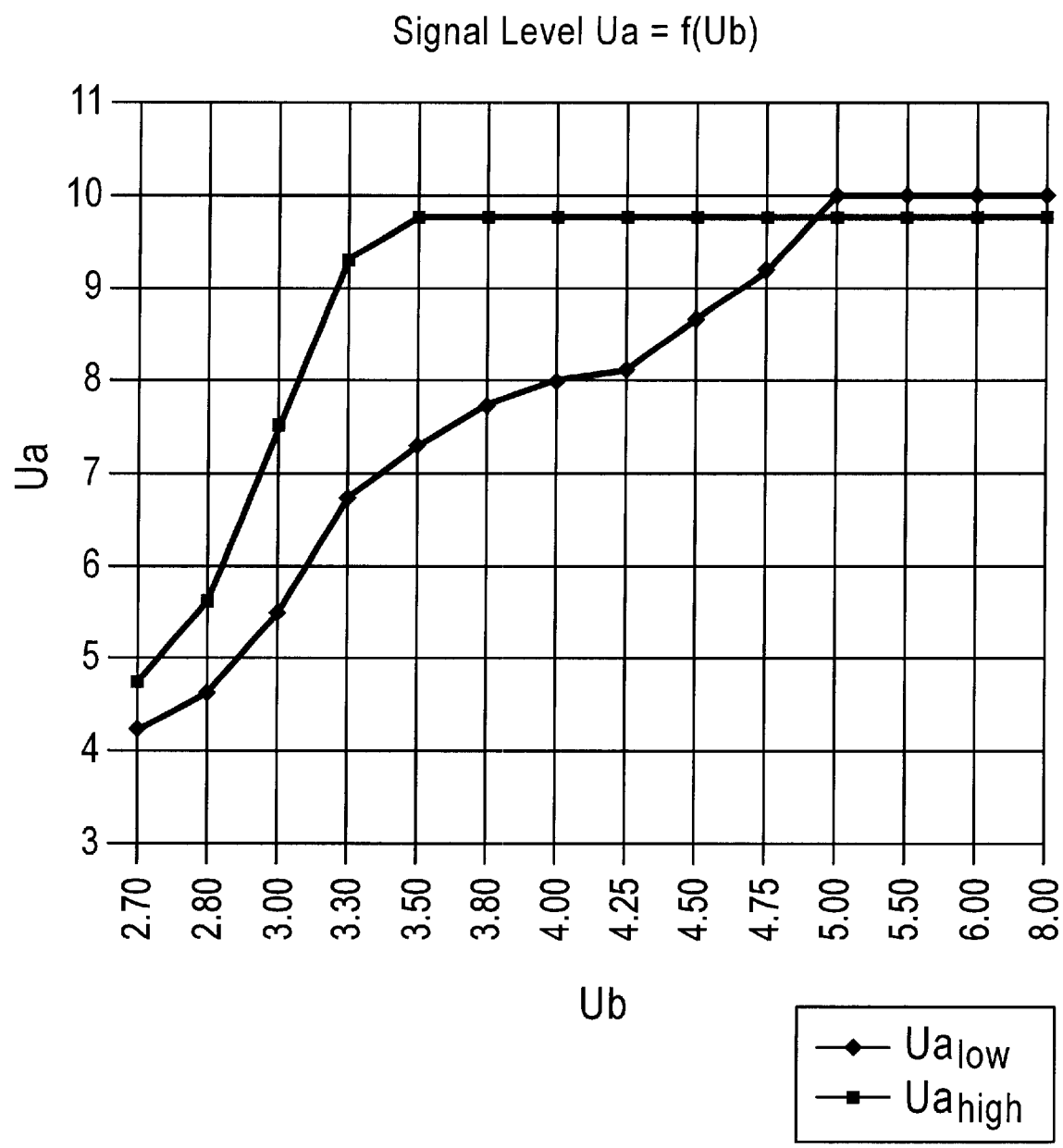
FIG. 1 is a graph showing the dependency of a sensor output signal on the supply voltage of the sensor.

The measured high and low sensor output voltages $Ua_{high}$, $Ua_{low}$ in dependence on the supply voltage Ub for an active sensor of a slip-controlled brake system (ABS) are plotted in FIG. 1. It becomes apparent from this illustration that the output signal drops in the event of reduction of the supply voltage Ub below a nominal value of 5 volt approximately.

Figure 2:
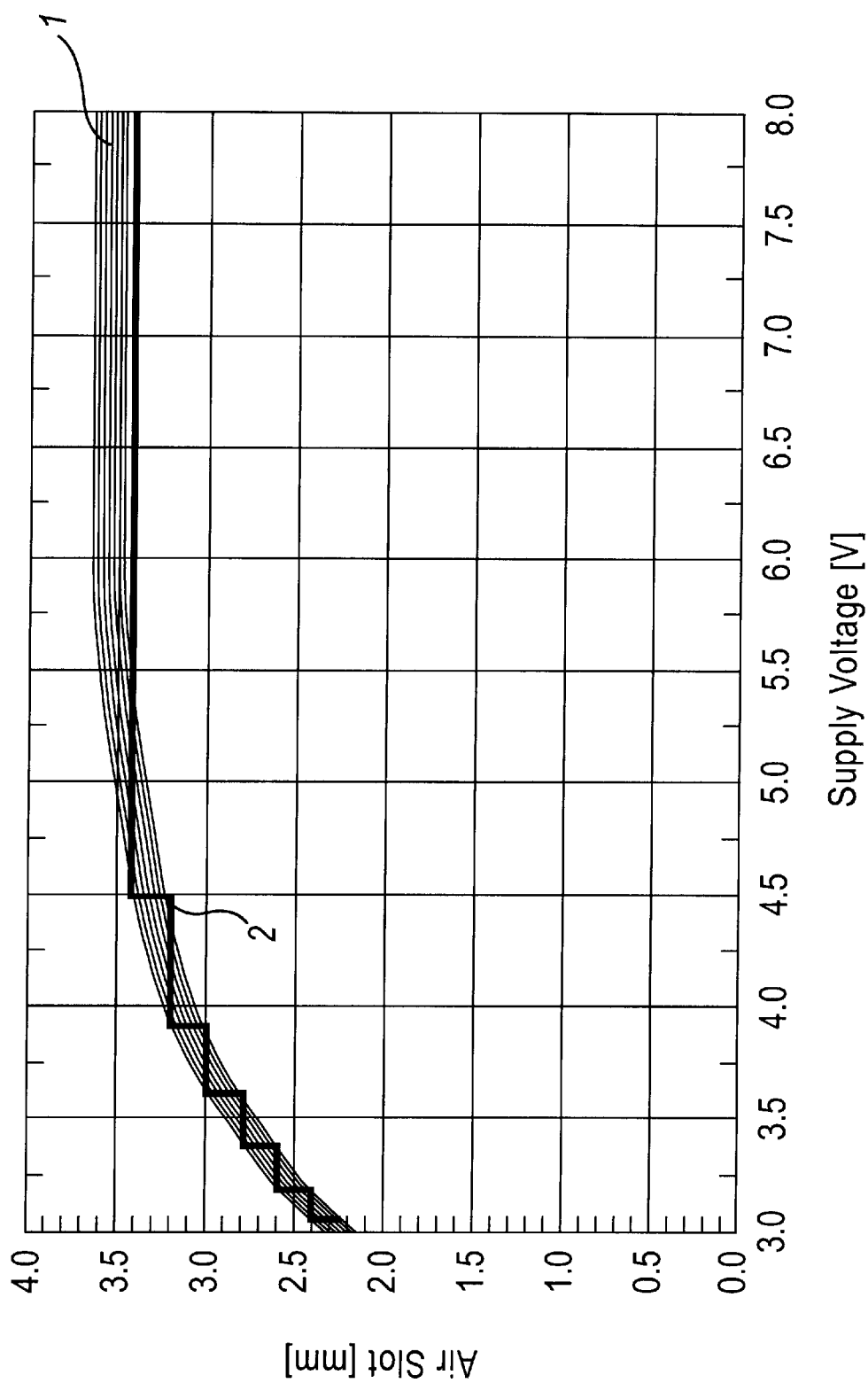
FIG. 2 is a graph showing the dependency of the maximum air slot on the supply voltage of the sensor.

In FIG. 2, the resulting physical correlation between the supply voltage of a sensor and the maximum air slot and a pulse wheel of an encoder generating a magnetic field is shown, where an undisturbed transmission is just still possible (maximum air slot). The stray range 1 of the curve represents the measured values for a large number of sensor elements in combination with the same pulse wheel. The stray range permits a quantization into about six ranges of distinction which are drawn as steps 2. To check and monitor the air slot, one or more of these steps can be used by correspondingly reducing the supply voltage.

Figure 3A:
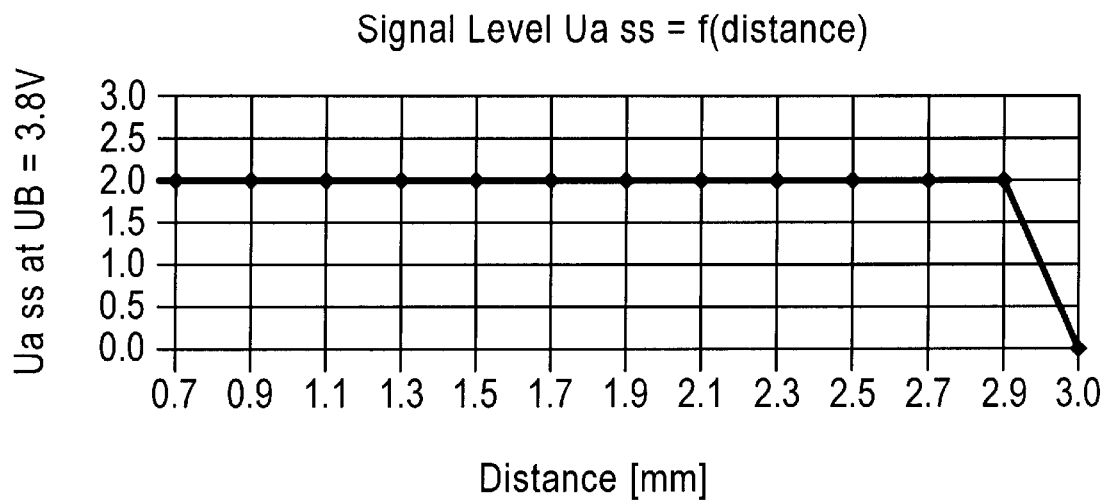
FIGS. 3a, 3b are graphs showing the sensor output voltage or the pulse/pause ratio in dependence on the size of an air slot.
Figure 3B:
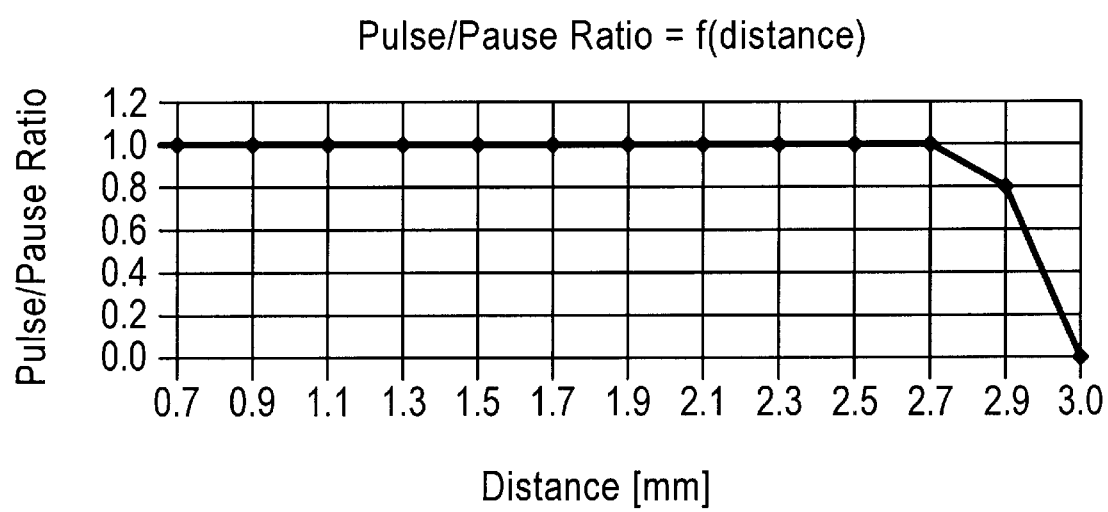

The sensor output voltage Ua is plotted as a function of the size of the air slot in the event of a supply voltage of the sensor of 3.8 volt in FIG. 3a. The illustration shows that the output voltage remains constant until an air slot of roughly 2.9 mm, and declines then. FIG. 3b shows for the same supply voltage the course of the pulse/pause ratio which will decline starting from an air slot of 2.7 mm approximately. It can be taken from both illustrations that, with this supply voltage, the maximum air slot will be reached at 2.7 mm approximately because trouble-free operation will no longer be safeguarded with larger air slots.

FIGS. 4a to 4e show the resulting availabilities of the sensor output signal 3, plotted against the length of the air slot, and thus the virtual reduction of the maximum air slot 4a, 4b, 4c, 4d, 4e with a decreasing supply voltage of the sensor. In relation thereto, besides, the nominal tolerance range 5 of the air slot is plotted which must prevail in view of installation tolerances, dynamic deformations, temperature variations, etc. There should be a safety minimum difference Dd (air slot reserve) between the maximum actual air slot to be assumed under these aspects, and the maximum air slot. Moreover, the size of the nominal tolerance range corresponds to the nominal operating voltage of the sensor which amounts to at least 5 volt approximately according to FIG. 2.

With respect to the possible quantization, the maximum air slot and, hence, the minimum difference Dd can be reduced in steps by decreasing the supply voltage of the sensor until it drops below the nominal tolerance range according to FIG. 4e. The operating voltages plotted in FIGS. 4a to 4e correspond to the quantization steps according to FIG. 2, however, FIG. 4 does not reproduce these steps in full scale.

Figure 4A:
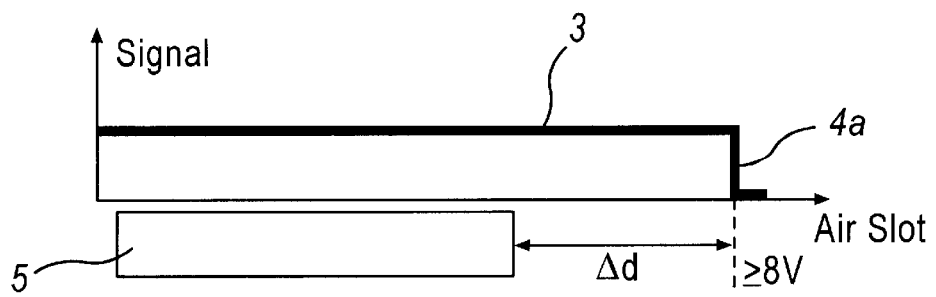
FIGS. 4a to 4e are illustrations showing the variation of the maximum air slot with different supply voltages of the sensor.
Figure 4B:
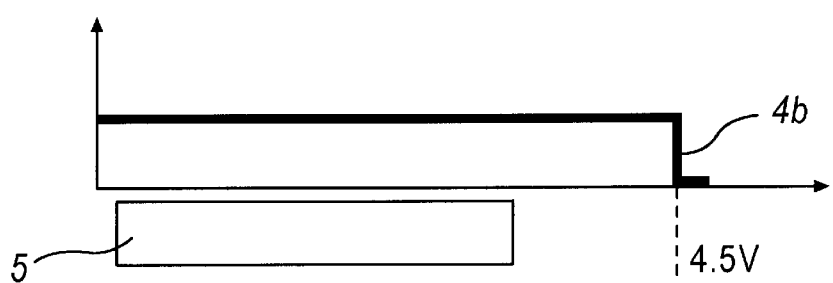
Figure 4C:
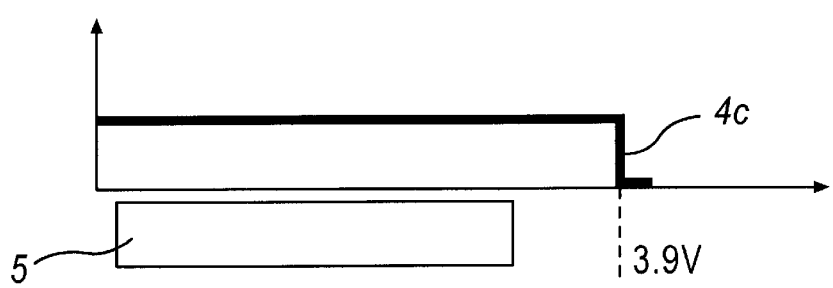
Figure 4D:
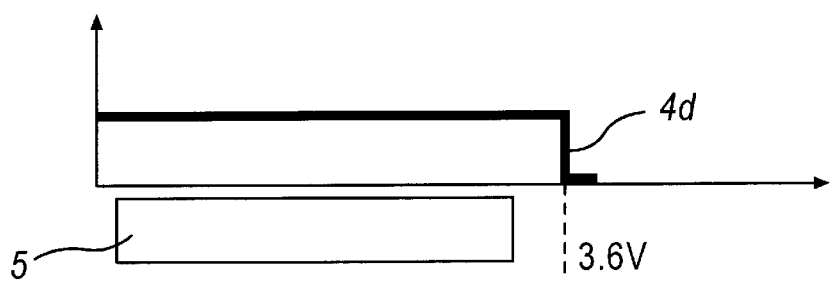
Figure 4E:
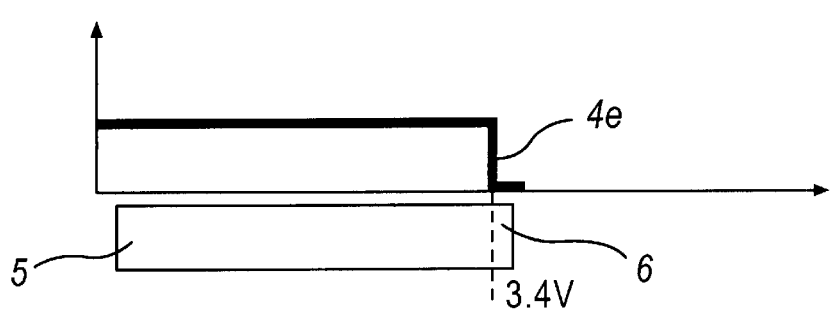

When the supply voltage of the sensor is reduced to the value of 3.4 volt shown in FIG. 4e, it is possible that the sensor output signal is interrupted when the actual installation air slot is just at the top end 6 of the nominal tolerance range 5 because the air slot is larger than the maximum air slot in this case.

This way, it is possible to check whether the actual installation air slot is within the range of the nominal tolerance range or has already become so large that it is relatively proximate the maximum air slot. This may, for example, be the case when the nominal tolerance range 5 was exceeded due to a wrong installation. In this event, the sensor signal would be interrupted already when the supply voltage of the sensor is decreased to a value according to FIG. 4c or 4d.

Also, it can be determined by the quantitative correlation between the supply voltage and the maximum air slot, which is illustrated in FIG. 2, how large the installation air slot actually is, or whether the size of the installation air slot differs by a desired minimum measure from the size of the maximum air slot, in the presence of the nominal supply voltage of the sensor. This difference would be fixed in dependence on the envisaged employment of the sensor, for example, in view of dynamic deformations of the air slot.

Figure 5:
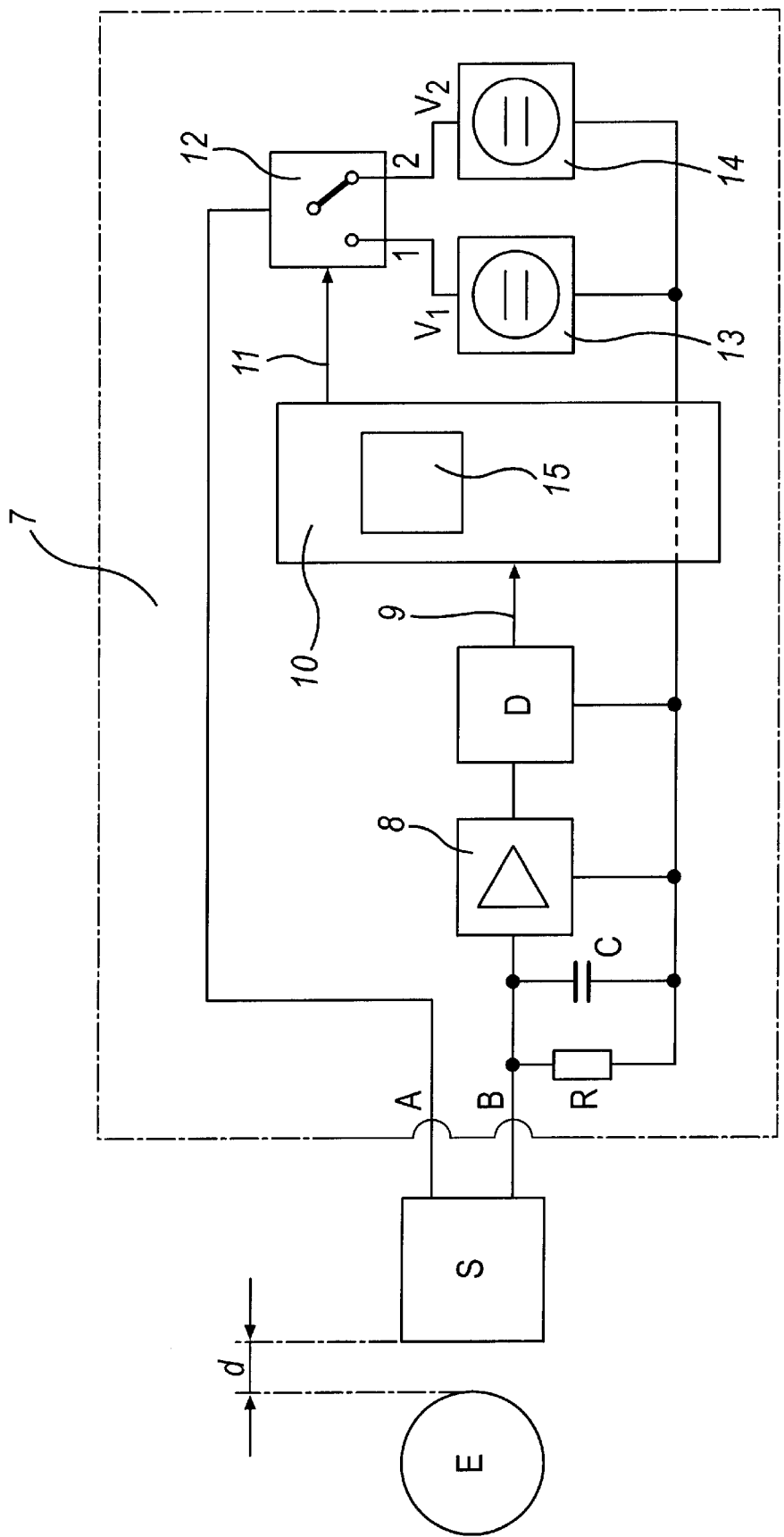
FIG. 5 is a schematic flow diagram of a device for checking and determining the installation air slot of an active sensor.

FIG. 5 shows a schematic diagram of a device 7 of the present invention for checking and determining the installation air slot of an active sensor S which is acted upon by an encoder E. A control unit of this type is employed in particular in a slip-controlled brake system for monitoring the installation position of the sensor for the wheel rotational speed.

The encoder E generally comprises a pole wheel (pulse wheel) by way of rotation of which a magnetic field with changing polarity is generated. To detect variations in the magnetic field, the sensor S includes, for example, a magneto resistive bridge (AMR bridge) and, connected downstream thereof, an amplifier assembly and trigger stage, the output signals of which are converted into two controlled constant currents with a polarity that changes with the rotation of the pole wheel. The effect of the trigger stage inside the sensor is that the sensor output signal remains constant, irrespective of the air slot, at least as long as the supply voltage of the sensor is within the nominal voltage range and the air slot d does not exceed the maximum limit value (maximum air slot).

The magnetic sensitivity of the magneto resistive bridge depends on the bridge supply voltage in a sensor of this type. In a prior art sensor element family, the bridge reacts, for example, with approximately 2 millivolt per 1 volt operating voltage to magnetic field variations of 1 kilo-ampere/m. Within the specified supply voltage range of the sensor, the bridge voltage is internally maintained constant at a value of 5 volt so that the sensitivity remains constant as well.

The circuit 7 in detail comprises an output A to which is applied the supply voltage for the sensor S, and an output B by way of which the sensor output signals are supplied. Connected to input B is an RC element and an input amplifier 8. Subsequent thereto is a sequence comparator D which is connected to a computer unit 10 with diagnosis memory 15 by way of a status line 9. A control input of a commutator 12 is connected to an output of the computer unit 10 by way of a control line 11. A first voltage source 13 is connected to a first input of the commutator 12, and a second voltage source 14 is connected to a second input thereof. The output of the commutator 12 is connected to the output A of circuit 7.

The current prevailing at the input B of circuit 7 generates at resistor R a voltage drop which is delivered to the input of the amplifier 8. The amplified input signal is monitored for signal interruptions by means of the sequence comparator D in that, for example, the pulse duty factor is evaluated by way of counting and comparing the portions with a high and low level.

The sequence comparator D produces a first status signal when the pulse duty factor corresponds to trouble-free operation, and a second status signal when the pulse duty factor changes due to signal interruptions. The status signals are sent to the computer unit 10 for diagnosis purposes and stored in the diagnosis memory 15, if necessary.

Where the objective is to check the mounting position of a sensor in the course of maintenance or after its installation, a monitoring routine can be started by an external signal which is sent to the computer unit 10. Initially, the sensor is furnished with the supply voltage V1 of the first voltage source 13 which is in the nominal voltage range by corresponding actuation of the commutator 12 by way of the control line 11.

When the encoder E rotates and a sensor signal is applied, the sequence comparator D will transmit the first status signal to the computer unit 10. The commutator 12 will be actuated by production of the switch signal on the control line 11 so that the second supply voltage V2 generated by the second voltage source 14 is applied to the sensor S. The second supply voltage V2 can be adjusted to any one or more of the values shown in FIGS. 4b to 4e, depending on the degree of accuracy exerted for the check of the installation position. Especially, it can be determined by a stepwise decrease of the second supply voltage V2 how great the difference Dd is between the prevailing air slot and the maximum air slot with the nominal supply voltage, and whether this difference has a desired safety minimum value.

When, for example, the sensor signal no longer exists already with a second supply voltage V2 of 3.9 volt, this means on the basis of the measured values according to FIG. 2 that the difference amounts to less than 0.5 mm. Thus, the distance between the sensor S and the encoder E should be diminished in order to reduce the risk of failures in the case of dynamic deformations or temperature variations, or similar events.

When, on the other hand, the sensor signal still prevails, even when a second supply voltage V2 of 3.4 volt (FIG. 4e) is applied, this means that the installation position of the sensor is within the nominal tolerance range 5 and, in addition, has a certain minimum distance from said's top end. The installation position of the sensor is assumed to be optimal in this case.

Preferably, the second supply voltage V2 can be generated by a D/A converter and/or adjusted in a programmed fashion.

The measurement results can be stored for tracing in the diagnosis memory 15. Especially, the correlations between the reduction of the maximum air slot and the supply voltage according to the illustration in FIG. 2 can be determined for a great number of specific sensor/pulse wheel combinations, e.g. on the front and rear axle of a vehicle, for a representative number of different combinations and stored as characteristic values in the diagnosis memory 15.

What is claimed is:

1. Method for checking or determining the installation air slot between an active sensor and an encoder, wherein the maximum size of the air slot (maximum air slot) which still ensures trouble-free operation of the sensor depends on the level of the supply voltage of the sensor, comprising the steps of:

A) reducing the supply voltage of the sensor to at least one value by which the maximum air slot is each time decreased by a desired test measure, and B) comparing the at least one test measure with a desired difference between the maximum air slot and the existing air slot by determining a variation of the sensor output signal by the reduction of the supply voltage, and C) evaluating the comparison result.

2. Method as claimed in claim 1, further including the steps of generating a stepwise reduced supply voltage fed to the sensor in a multitude of values which correspond each time to a decrease of the maximum air slot by a predetermined test measure until trouble-free operation of the sensor is at least temporarily no longer possible, and in that signaling is then generated.

3. Method as claimed in claim 1, further including the step of decreasing the supply voltage fed to the sensor by a value that corresponds to a predefinable test measure, and determining whether trouble-free operation of the sensor is still ensured.

4. Method as claimed in claim 1, further including the step of automatically performing steps A), B), and C) by way of a program control of a slip-controlled vehicle brake system.

5. Device for checking the installation air slot between an active sensor and an encoder, wherein the maximum size of the air slot (maximum air slot) which ensures trouble-free operation of the sensor depends on the level of the supply voltage of the sensor, comprising:

a first means for reducing the supply voltage of the sensor to at least one value by which the maximum air slot is decreased each time by a desired test measure, and a second means for comparing the at least one test measure with a desired difference between the maximum air slot and the actual air slot by sensing a variation of the sensor output signal caused by the reduced supply voltage as well as for evaluating the comparison result.

6. Device as claimed in claim 5, wherein the sensor includes:

a pick-up for measuring data that reacts to a change in the magnetic field, and trigger circuit connected downstream thereof, and wherein the first means permits reducing the supply voltage to a value at which the sensitivity of the bridge is reduced, while still maintaining the operation of the amplifier circuit is still maintained.

7. Device as claimed in claim 5, further including a first voltage source for generating a nominal supply voltage, and wherein the first means includes a second voltage source for generating the reduced supply voltage and a commutator controlled by a computer unit for alternatively applying the first or the second voltage source to the sensor.

8. Device as claimed in claim 5, wherein the second means includes a sequence comparator for monitoring the sensor output signals with respect to malfunctions or signal interruptions.

9. Device as claimed in claim 5, further including a diagnosis memory for storing the comparison results.

* * * * *